(12) United States Patent
Hollis

(10) Patent No.: US 6,487,992 B1  
(45) Date of Patent: Dec. 3, 2002

(54) DOG BEHAVIOR MONITORING AND TRAINING APPARATUS

(76) Inventor: Robert L. Hollis, 206 Carr Cir., Headland, AL (US) 36345

( * ) Notice: Subject to any disclaimer, the term of this patent is extended or adjusted under 35 U.S.C. 154(b) by 0 days.

(21) Appl. No.: 09/933,564

(22) Filed: Aug. 20, 2001

Related U.S. Application Data (63) Continuation of application No. 09/885,152, filed on Jun. 20, 2001, now abandoned, which is a continuation-in-part of application No. 09/444,732, filed on Nov. 22, 1999, now Pat. No. 6,263,836.

(51) Int. Cl.[7] .............................................. A01K 29/00
(52) U.S. Cl. ...................................................... 119/712
(58) Field of Search ................................ 119/712, 718, 119/719, 720, 721, 908, 174; 340/573.1, 573.3

(56) References Cited

U.S. PATENT DOCUMENTS

| | | | |
|---|---|---|---|
| 4,202,293 A | 5/1980 | Gonda et al. | |
| 4,627,385 A | 12/1986 | Vinci | |
| 4,887,549 A | 12/1989 | Powell | |
| 5,391,080 A | 2/1995 | Bernacki et al. | |
| 5,430,435 A * | 7/1995 | Hoch et al. | 273/DIG. 17 |
| 5,559,498 A * | 9/1996 | Westrick et al. | 119/721 |
| 5,652,570 A | 7/1997 | Lepkofker | |
| 5,694,340 A * | 12/1997 | Kim | 434/252 |
| 5,733,201 A | 3/1998 | Caldwell et al. | |
| 5,752,976 A | 5/1998 | Duffin et al. | |
| 5,799,618 A | 9/1998 | Van Curen et al. | |
| 5,815,077 A | 9/1998 | Christiansen | |
| 5,857,433 A | 1/1999 | Files | |
| 5,868,103 A | 2/1999 | Boyd | |
| 5,902,351 A | 5/1999 | Streit et al. | |
| 5,913,284 A * | 6/1999 | Van Curen et al. | 119/718 |
| 6,073,589 A * | 6/2000 | Curen et al. | 119/718 |
| 6,122,960 A | 9/2000 | Hutchings et al. | |
| 6,263,836 B1 * | 7/2001 | Hollis | 119/712 |

* cited by examiner

Primary Examiner—Thomas Price  
(74) Attorney, Agent, or Firm—Lanier Ford Shaver & Payne, P.C.; Gerald M. Walsh (57) ABSTRACT

An apparatus and method for behavior monitoring and training for an animal, comprising a remote unit with a microprocessor, motion sensors, global position system receivers, stimulators, and batteries. The remote unit microprocessor receives monitoring and training instructions from a host unit and signals from the motion sensors and global position system receivers. The remote unit, when placed on an animal, produces training stimuli, including sound and/or electric shock, in response to digging and jumping. When a microphone and global position system receiver are also employed in the remote unit, the remote unit can also produce training stimuli in response to barking and leaving a confined area.

66 Claims, 6 Drawing Sheets

DOG BEHAVIOR MONITORING AND TRAINING APPARATUS

This is a continuation of U.S. patent application Ser. No. 09/885,152 filed Jun. 20, 2001, now abandoned which is a continuation-in-part of U.S. patent application Ser. No. 09/444,732, filed Nov. 22, 1999, now U.S. Pat. No. 6,263,836 issued Jul. 24, 2001.

FIELD OF THE INVENTION

The present invention relates to the field of electronic animal training devices, and more particularly, to an electronic device that automatically and independently trains an animal not to vocalize, not to dig, and not to jump on people, and to remain within a designated area.

BACKGROUND OF THE INVENTION

Electronic dog training collars that provide warning sounds, followed by some form of punishment for the purpose of training dogs not to engage in nuisance barking are well known. This type system is activated when a dog's barking sound is picked up from the dog's throat area by a sound-sensing device located on a dog collar. This type device does not allow a user selectable time delay before corrective action, currently thought to be desirable. This type device also does not allow a user a selectable option to apply correction only at night when barking is most objectionable.

Electronic dog training collars that provide warning sounds, followed by some form of punishment for the purpose of training dogs to stay within an established area are also well known. This type system is activated when a collar based radio receiver picks up a signal transmitted through a buried wire antenna. This type device does not provide a method for allowing the dog to return to within the established area in the event he escapes, without receiving correction.

A third type of electronic dog training collar provides warning sounds, then some form of punishment only when perceived behavioral problems are visually detected by the dog owner who activates a radio transmitter contained within a hand held radio transmitter enclosure. This signal, in turn, is received by a dog collar based radio receiver and the correction sequence is initiated. Some training collars of this type have a tilt switch which senses whether a dog is moving or standing still (pointing). This training method may allow dog owner frustration to enter into the training process which can result in over correction, causing additional behavioral problems.

In all of the above-described systems, warning sounds are provided by a buzzer or loud speaker. Punishment stimuli include electronic stimulation, loud and/or high-pitched sounds, chemical sprays, and flashing lights.

The inventor of the present invention discovered through intensive field work with dogs, that with the use of accelerometers or motion detectors, an associated microprocessor containing unique software algorithms, and supporting circuitry, the detection of heretofore undetectable and undesirable behaviors such as digging and jumping up on people and/or objects is practical. After detection the microprocessor directs the system to provide owner prerecorded voice warning, and if selected, an optional electronics based stimulus.

Acceleration-sensitive motion analyzers use acceleration sensors that are attached to an object under study which can continuously monitor the motion of the object. Accelerometers or motion detectors are used in such diverse areas as industrial, medical, railway, automotive and aerospace engineering. The accelerometers used in these devices may detect either or both, dynamic and static acceleration, and are capable of providing electrical output signals to a microprocessor and/or a data recorder.

SUMMARY OF THE INVENTION

The present invention provides an apparatus and method for monitoring and training a canine, and has potential uses in the monitoring and training of any quadrupedal animal. In a preferred embodiment all hardware and software associated with the training functions are located within a remote electronics enclosure which is attached to a dog harness at the shoulder blade area. The electronics and software located within this electronics enclosure are capable of monitoring, based on owner selected preferences, one or more of the following behaviors: digging behavior, jumping up behavior, nuisance barking behavior, and movement relative to a containment area. A motion sensor system is used in detecting the digging and jumping up behavior, a microphone located in the bottom of the electronics enclosure and just above the dog's chest area is used in detecting barking vibrations through the chest cavity, and a global position system receiver is used to determine the position of the dog within the containment area. The motion sensors can also be used to determine the position of the dog within the containment area. Processing of motion data, sound data, and position data is accomplished by a microprocessor and its associated unique software algorithms contained within the electronics enclosure. The functions of the hardware and software contained within the remote electronics enclosure are selected by the user, and the batteries are recharged, while the remote electronics enclosure is connected to a host unit using a custom designed, magnetic latching connector. The user is allowed the option of inputting his or her own voice commands, selecting one or more of the four possible system functions described above, as well as selecting various options within each function, for example an option is available to correct for nuisance barking only at night. The selections of these options is accomplished using a four keypad, a LCD and its associated messages, and prerecorded voice assistance messages. All options are available to the user by selecting the 'yes' or the 'no' key and stepping through the host program decision tree. All user interface functions of the host unit are controlled by the microprocessor contained within the host unit. All training instruction options and user recorded voice commands are passed to the microprocessor and voice data storage chip located within the remote electronics enclosure. The remote electronics enclosure unit is completely independent from any user input once the unit is removed from the host unit and placed in the dog harness and into use. This independence insures that the device is incapable of producing overcorrection and associated unsafe situations for the dog.

An advantage of the present invention to provide an electronic device for an animal that monitors behavior, including vocalization, digging, jumping, and approaching a containment wire or predefined boundary.

Another advantage of the present invention is to monitor digging and jumping in an animal using an accelerometer or motion detector.

Another advantage of the present invention is to use an accelerometer or motion detector, microphone, and a receiver simultaneously to monitor behavior in an animal.

Another advantage of the present invention is to train an animal by monitoring behavior such as vocalization, digging, jumping, and approaching a containment wire and by using stimulators such as voice commands, electric shocks, or a combination thereof.

Another advantage of the present invention is to provide a remote unit contained in a harness attached to an animal to monitor and modify behavior independently.

Another advantage of the present invention is to provide a remote unit contained in a harness attached to an animal to receive transmissions from a containment wire defining a containment area, warn or punish when the containment wire is approached or traversed, and allow reentry into the containment area without punishment.

Another advantage of the present invention is to provide a host unit with a microprocessor allowing inputting monitoring and training instructions into a remote unit having a microprocessor, adjusting operating parameters in the remote unit microprocessor, and navigating through a decision process to select active functions, voice messages, sound levels, electric stimulation voltage level, and electric stimulation duration.

Another advantage of the present invention is to provide a host unit having a transmitter for an integrated boundary wired containment system and a battery charging system to charge batteries in a remote unit.

Another advantage of the present invention is to provide a remote unit contained in a harness attached to an animal to receive transmissions from GPS satellites and to compare the resulting identified physical location of the animal to a defined boundary previously entered into the remote unit via the host unit.

BRIEF DESCRIPTION OF THE DRAWINGS

These and other features, aspects, and advantages will become more fully apparent from the following description, appended claims, and accompanying drawings in which:

DETAILED DESCRIPTION OF THE PREFERRED EMBODIMENT

Figures 1, 2:
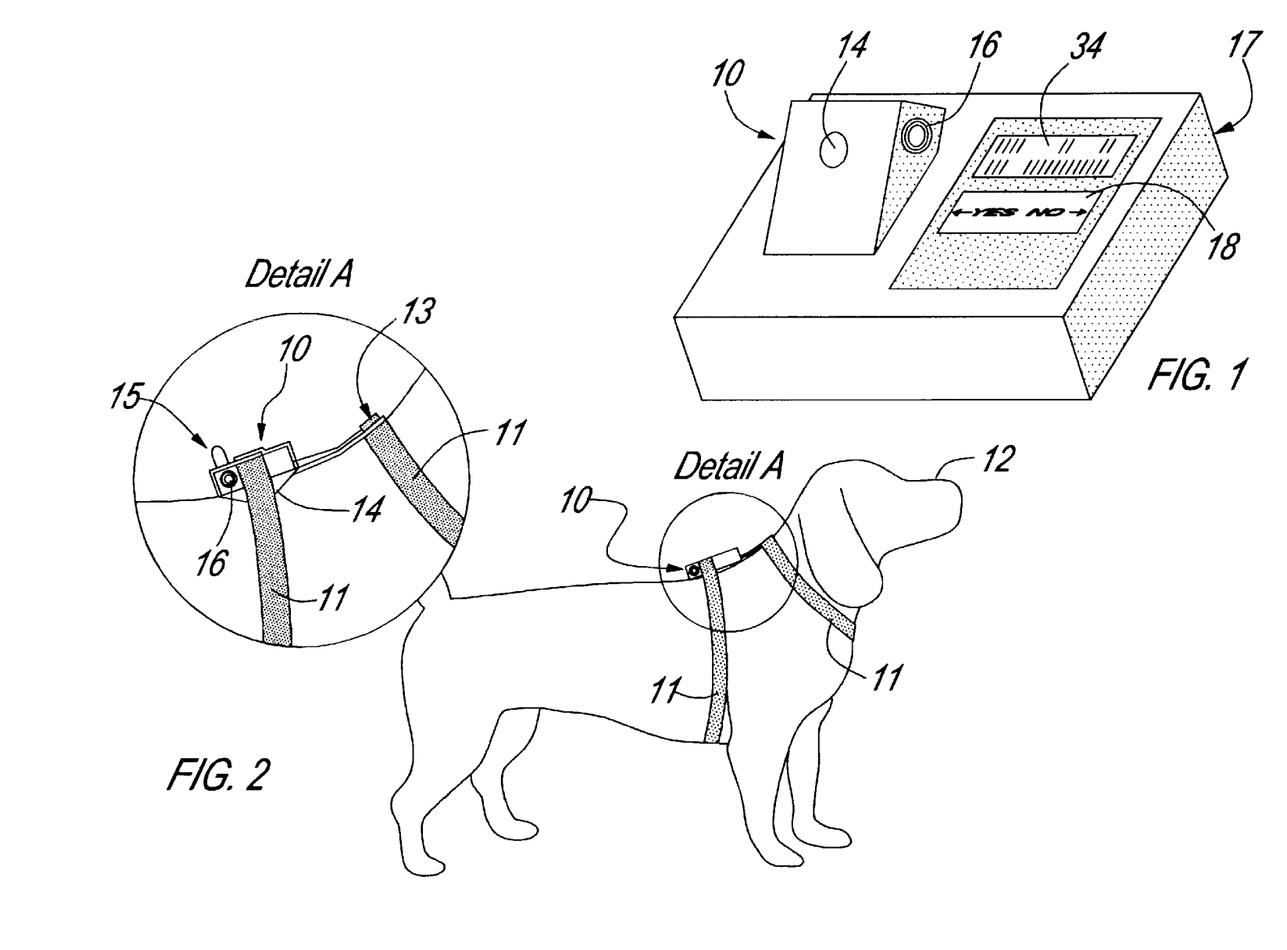
FIG. 1 illustrates the remote unit docked in the host unit.
FIG. 2 illustrates the placement of a remote unit on a dog.

FIG. 1 shows a preferred embodiment of the present invention comprising a remote unit 10 and a host unit 17, with remote unit 10 "docked" in host unit 17. The remote unit has a microphone 14 on the underside, and a loudspeaker 16. Host unit 17 has a keypad 18, with a display unit 34, for providing input necessary for adjusting operating parameters of remote unit 10.

FIG. 2 shows a remote unit 10 inserted into a harness 11 in place on a dog 12. Detail A shows the positioning of the various devices used by remote unit 10. Stimulation electrodes 13 provide electrical paths to dog's 12 skin. The microphone 14 picks up noise from dog's 12 chest cavity and is used to sense vocalization, such as, for example, barking. Remote unit 10 has a light emission display (LED) 15 which is an ultra-bright device capable of being seen through a wide field (130E) of vision. A loudspeaker 16 provides audible user voice commands to dog 12.

Figure 3:
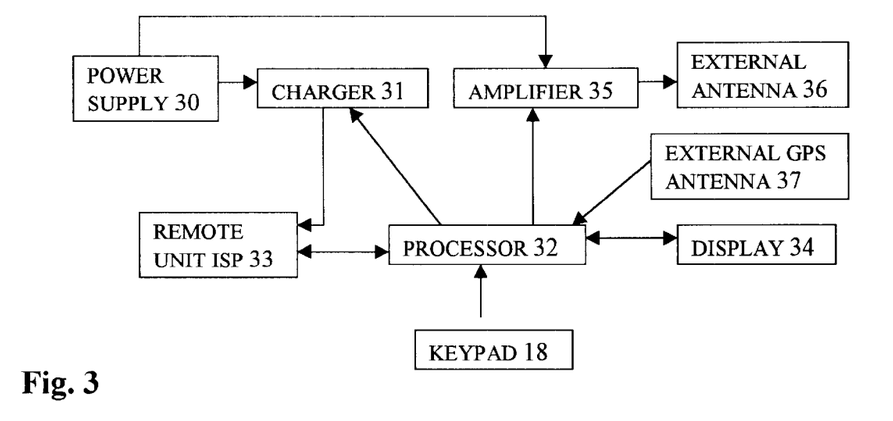
FIG. 3 is a block diagram of a preferred embodiment of the host unit of the present invention.

FIG. 3 illustrates the components of host unit 17. Power supply 30 supplies low voltage DC power to host unit 17. Charger circuit 31 is controlled from processor 32 and monitors a battery 59 (see FIG. 4) in remote unit 10 via an in-circuit serial programmable (ISP) port 33 and supplies an appropriate charge when remote unit 10 is docked in host unit 17. A user interface function is provided by keypad 18 and a display unit 34, preferably a two-line liquid crystal display (LCD) character display. Keypad 18 and display unit 34 are controlled by processor 32. Processor 32 generates a continuous pseudo random phase encoded sinusoidal low frequency ac signal, for a wired containment system, which is amplified and filtered by amplifier 35 to transmit to and drive an external containment fence antenna 36 surrounding a containment area in which an animal is to be confined. This wired containment system is a subsystem of the host unit 17 and provides a corresponding electromagnetic field throughout the length of the buried wire antenna 36. Amplifier 35 ensures that a constant signal current is supplied to external antenna 36, independent of the length of antenna 36, up to the operating limits of host unit 17.

Host unit 17 with a remote unit 10 in the docked position, provides for monitoring and charging remote unit batteries 59 (FIG. 4), setting and monitoring all control options, recording and playing back user voice messages and playing back preinstalled programming guidance messages. With remote unit 10 removed from the host unit 17, host unit 17 can, if selected as a user option, provide the transmitter for an integrated dog boundary wired containment system. Host unit 17 can serve as the host for an unlimited number of remote units 10.

Microprocessor 32 provides for programming and central control of all host activities including necessary control, monitoring, programming, and serial communication with the remote unit microprocessor 51 (see FIG. 4), while docked, and for signal processing and display functions. Display 34 provides the user, while remote unit 10 is in the docked position, a means to visually display current operating parameters of remote unit 10, and as a visual interface to be used in conjunction with the keypad 18 in viewing and altering operating parameters of remote unit 10.

Loud speaker 16 provides the user, while a remote unit 10 is in the docked position, audible prerecorded programming guidance messages indicating current system operating system parameters, etc., and providing an audio interface to be used in conjunction with the keypad 18 to alter operating parameters of a remote unit 10. Loud speaker 16 is connected to and controlled by host unit 17 using a serial bi-directional serial connector 33 when a remote unit 10 is docked to the host unit 17.

Microphone 14 (see FIG. 4) provides the user, while a remote unit 10 is in the docked position, a means for recording voice input for dog behavior correction and reward command messages into the remote unit voice processing circuit. This microphone 14 is located on remote unit 10 but serially connected to and controlled by the host unit when the remote unit is docked to the host unit 10.

Keypad 18 provides, while remote unit 10 is in the docked position, input necessary for adjusting operating parameters of the remote unit 10. A PIN number (security number) can be required and entered before changing function options. A user can navigate through a decision process in selecting active functions, voice messages, sound levels, stimulation circuit voltage levels, stimulation duration, correction delays, etc. In a preferred embodiment navigation is accomplished by selecting either 'yes' or 'no' keys on keypad 18. Two other keys allow the user to navigate back to the last screen display or navigate forward to the next screen display. A battery charger 31 provides the means to safely charge, monitor, and maintain a good charge condition for a NiMH battery contained within the remote unit, via a serial connector.

In an alternative embodiment, host unit 17 also has a standard serial port for connection to a personal computer to allow for remote firmware upgrades for the microprocessor operating systems of both host unit 17 and remote unit 10 via the Internet or a disk, with supplied communication software, such as in PC or MAC format, for example. This embodiment also provides for reviewing and setting of all functions, levels, durations and user messages within a PC or MAC environment.

Figure 4:
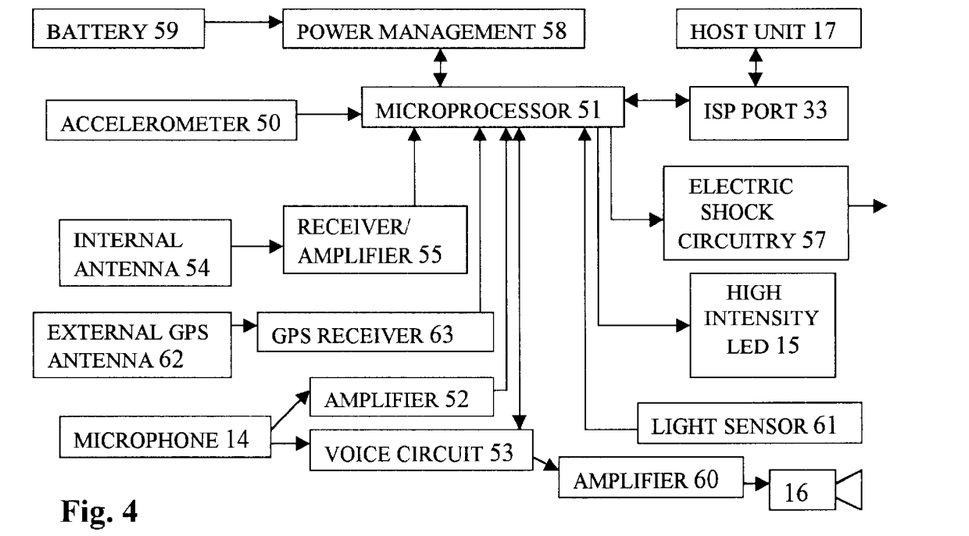
FIG. 4 is a block diagram of a preferred embodiment of the remote unit of the present invention.

FIG. 4 shows the components of remote unit 10. The dual axes accelerometer 50 provides digital signals to microprocessor 51 proportional to vertical and horizontal orientation, and dynamic movement. Processor 51 checks these signals and decides if they justify a stimulus, by checking against the user defined parameters for that function. Only if a stimulus is required will the selected stimulus be delivered, at the level set, for the duration set. The accelerometer 50 is used to determine two functions, digging and jumping up. Although an accelerometer is described, any suitable motion detector can be used.

The microphone 14 is used to detect vocalizations, preferably from the chest cavity of the animal, which are amplified by the audio amplifier 52 before being fed into microprocessor 51 for analysis. It is also used to allow user recorded messages to be input, and saved in voice circuit 53 when remote unit 10 is docked with host unit 17. If the vocalization is of sufficient magnitude and duration, as set by the user, the selected stimulus will be delivered at the level set and for the duration set. This stimulation may be adapted after a user selects a time delay and may be applied, if selected, only at night.

An internal antenna 54 picks up containment signals when the animal moves within range of the containment wire (external antenna 36). These signals are amplified by the receiver/amplifier 55 and fed into microprocessor 51 for analysis and decoding. Detection is triggered at two levels, for a warning stimulus, as the animal nears the inner confinement region of the containment wire, and another stimulus as the animal crosses the containment wire to the outer containment region. The stimulus provided, levels, and duration are all selected and set by the user within predefined limits. The phase of the signal is analyzed by microprocessor 51, which decodes the signal by regenerating pseudo random information in the same fashion as the transmitter and is used to determine which side of the containment wire fence the animal is on, by comparing the decoded phase with that received. If the phase is opposite to that expected, microprocessor 51 decides that the animal has escaped outside the containment area, and disables any stimulus. This allows the animal to return.

The stimulus selected can be one of two types, voice messages/sounds replayed from voice circuit 53 via audio amplifier 60 into loudspeaker 16 or a short pulsed electric shock, delivered via two metal collar studs, generated by shock circuit 57. The levels of each of these and the duration are independently selectable by the user. Voice circuit 53 is also used by host unit 17, when remote unit 10 is docked, to provide prerecorded user messages during programming/charging. Shock circuit 57 is a separate module within the unit and may be omitted if not required by the user.

Microprocessor 51 saves power by shutting down the system into a sleep mode, and only waking to process signals at intervals. It does this by controlling the power management circuit 58. During the short wake mode, microprocessor 51 also drives a high intensity LED 15 to provide indication of system function. Low battery is indicated by the lack of pulsing LED. This also provides a useful beacon function during low light conditions. Power management circuit 58 also saves power, in the wake mode, by only selecting one sensing circuit at a time in succession. The system also shuts down anytime the animal is not moving, for example, when the animal is asleep, which may be as much as 60% of each day. The result is very low power consumption, enabling long periods of use between battery charges.

Battery 59 is a NiMH type providing high energy density in a small size, and having no memory effect. This provides at least 1000 charge/discharge cycles before replacement is necessary.

The ISP port 33 connects with the host unit 17 when docked and provides two-way digital serial communication between the two units. The same port also automatically connects battery 59 for charging and analysis.

A light dependent resistor (LDR) 61 allows remote unit 10 options to be day or night selective. This light sensor 61 is employed to allow barking to go uncontrolled during daylight hours, and stimulus only applied at night, when most nuisance barking occurs.

Remote unit 10, when in use as an intelligent remote device, is attached to but removable from a supplied animal harness with pouch. It is programmable by host unit 17. It is an intelligent unit, which includes an audio system for recording (when attached to the host unit 17) and playing back remotely (when used on an animal), user voice correction and reward messages. Accelerometer 50 provides detection of static and dynamic acceleration. Stimulation circuitry module 57 provides physical behavioral correction. Internal antenna 54 and receiver/ amplifier 55 provide for reception of the containment subsystem signals, which are decoded by microprocessor 51. A high intensity LED 15 acts as battery monitor and night location beacon.

Microprocessor 51 provides central control, monitoring and signal processing functions for all remote unit activities. In this capacity, the microprocessor initiates, via loud speaker 16 and/or stimulation circuitry 57, audible and/or electrical stimulus to the animal, when selected animal behavior criteria fall outside predefined limits.

Accelerometer 50 provides monitoring of animal body movement and provides input to microprocessor 51. Many kinds of motion sensors may be suitable for this purpose. A preferred embodiment is accelerometer 50, known in the art. It is a complete 2-axis accelerometer with a 2 g measurement range. It can measure both dynamic acceleration as well as static acceleration forces, including acceleration due to gravity, so the sensor can be used to measure X and Y tilt where it is placed. When the accelerometer is oriented so both the X and Y axes are parallel to the earth's surface it can be used as a two axis tilt sensor with a roll and pitch axis. Ninety degrees of roll would indicate that the dog is laying on its side. In addition, when the accelerometer indicates no movement at all, regardless of the orientation of the dog, the dog is asleep or inactive and the system is powered down, as described above. Thus, the accelerometer can readily detect when the dog is not standing. The accelerometer is placed directly above the shoulder blades and is contained within remote unit 10 and associated dog harness 11 as described in FIG. 2.

With regard to digging movements of the dog, the accelerometer can detect forward motion (dynamic motion) or lack of forward motion of the dog, in addition to X and Y tilt. If the accelerometer detects that the dog's forward motion has stopped and a motion perpendicular to the main axis of the dog continues, the dog is digging. If this criteria is used in conjunction with accelerometer recognition of a downward tilt toward the front of the dog's body, the digging motion is firmly established. The accelerometer can easily detect when the dog is not standing and the dog can only dig when standing. Thus, the digging detection can be disabled automatically when the dog is laying down, rolling over, etc. With regard to jumping, when the accelerometer detects a movement essentially straight up, or up and slightly rearward, the dog is jumping up. Based on these criteria, standard software programming can be used to detect and report digging or jumping.

Voice generating circuit 53 and power amplifier 60 are under control of microprocessor 51 providing user correction and reward audio data to loud speaker 16. Microphone 14 provides monitoring of vocalization through the body cavity and provides audio signal input to amplifier 52 and microprocessor 51 while remote unit 10 is on the dog. Loud speaker 16 provides audible animal correction and reward commands while the remote unit 10 is on the dog.

Stimulation circuitry module 57 provides a series of voltages form 500 volts to 4500 volts, if/as selected by the user when remote unit 10 is docked to host unit 17. This voltage correction provides a maximum current of 200 micro-amps for less than 25 milliseconds in a burst. Duration is from one to a maximum of ten seconds, as selected by the user when remote unit 10 is docked to host unit 17. A user can select a delay time period of from one minute to ten minutes of continuous barking, before applying voice and/or correction stimulation, due to the fact that a dog barks as naturally as human beings talk. This is consistent with the LDR feature 61 which allows remote unit 10 to be day or night selective. To attempt to eliminate all barking is thought to be cruel and counterproductive.

Dog containment is within an area enclosed by a boundary wire antenna. The encoded pseudo-random electromagnetic signal generation and processing used in this system ensures that the voice and/or correction stimulus is used only for containment, and operates only as the dog moves near to and through the containment wire antenna to the 'outside' area. The correction capability is then disabled by microprocessor 51 to allow the dog reentry into the containment area, without receiving correction. The correction capability is then restored by microprocessor 51 to address the next move near to or through the containment wire antenna to the 'outside' area.

When the dog enters the electromagnetic field radiating from external antenna 36 transmitted from host unit 17 which is generating pseudo-random encoded signals, internal antenna 54 and receiver/amplifier 55 located within remote unit 10 pick up the signal and send it to microprocessor 51 for decoding. Microprocessor 51 determines the strength of the containment signal to find out how close the animal is to the containment fence. If it falls within the warning region, the selected training stimulus is provided to deter further movement in that direction. Should this fail and the containment signal grows stronger, signaling a move closer towards the fence, the main stimulus is provided. If the dog chooses to ignore this or moves at great speed to rush the fence, thereby rendering any system ineffective, the dog passes over the containment fence toward the outside of the containment area. The signal is still being received by remote unit 10. Microprocessor 51 now determines from the change in phase of the containment signal, that the dog is outside the containment area and cancels any stimulus so that the dog may return to the containment area.

If the dog moves outside the range of the containment signal and outside the containment area, microprocessor 51 determines this and provides a voice message (for example, "GO HOME!") from loudspeaker 16. If the dog moves back towards the containment fence to return within the containment region and the containment signal is received by the remote unit, microprocessor 51 determines from the phase of the containment signal, that the dog is outside the containment area and moving in, and thus cancels the audible beep (or voice message) and suppresses any stimulus to allow the dog to return. When the dog returns within the containment fence and within the allowed region, microprocessor 51 now determines, from the loss of containment signal and the previous condition, that the dog has returned and resumes normal operation.

Figure 5:
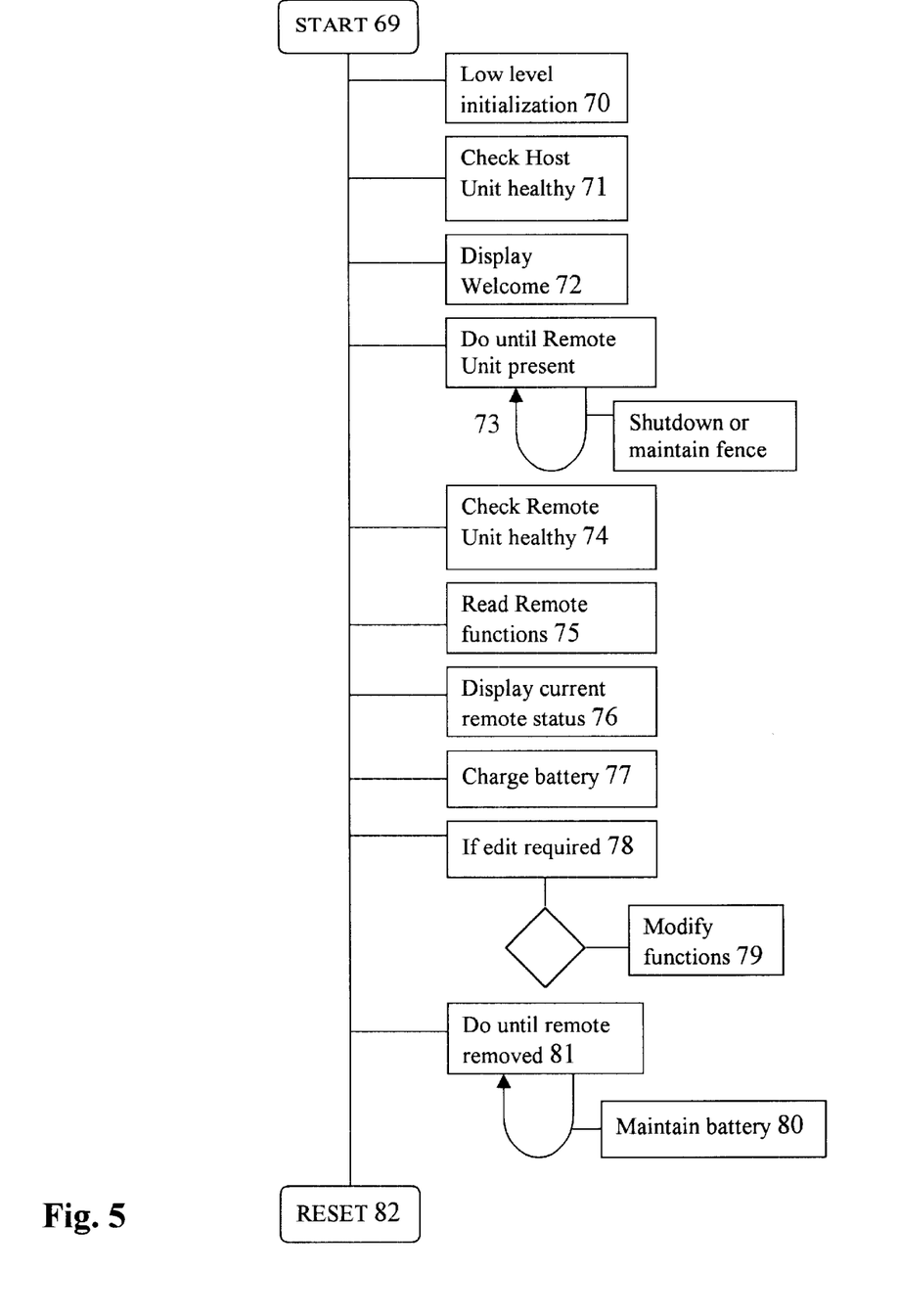
FIG. 5 is a flow diagram of the functions of the host unit.

FIG. 5 is a flow diagram of the functions of the host unit. When power is first applied to host unit 69 the microprocessor performs a standard initialization procedure 70 and standard function checks 71 and displays a welcome 72. If no remote unit is detected by the host unit and the wire fence is enabled, then the pseudo-random signals are transmitted to the antenna until a remote unit is docked 73. The remote unit is then checked for correct function and the battery condition assessed 74. The functions selected in the remote unit are read into the host unit 75 and then displayed on the display of the host unit 76. The battery charger is then started 77. If editing of the functions is required, this is done 78 and the new functions are transmitted to the remote unit 79. The battery charge continues until the battery is fully charged and then the battery charger switches into a low current maintenance charge 80 until the remote unit is removed 81. The system then resets 82 and starts again 69.

Figure 6:
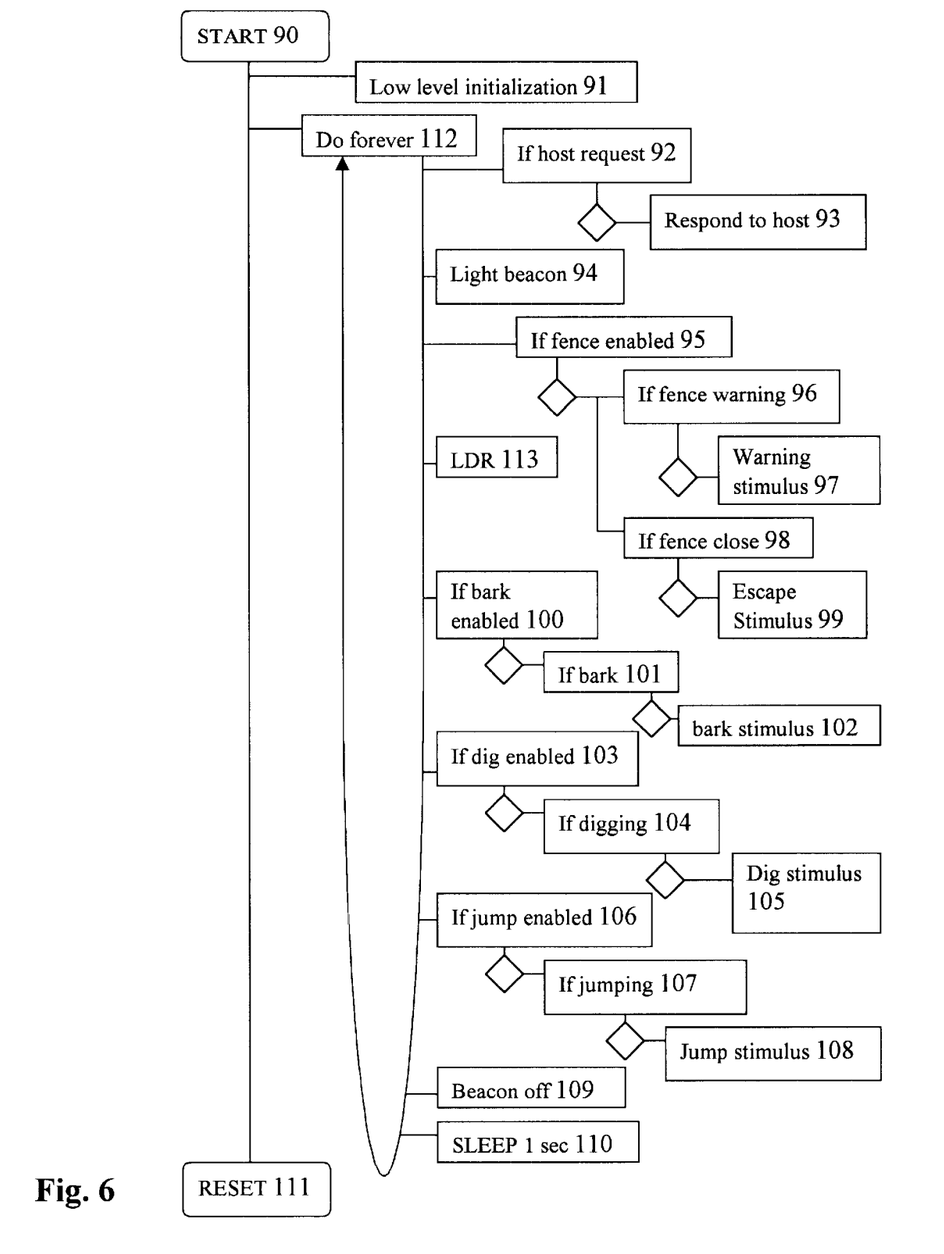
FIG. 6 is a flow diagram of the functions of the remote unit.

FIG. 6 is a flow diagram of the functions of the remote unit. The remote unit will start 90 when power from the battery is available and the unit is turned on. The remote unit maintains a low level of initialization 91 by following a continuous cycle 112 enabling each part of the circuit in turn in order to reduce power consumption. If the remote unit is docked with the host unit, the host unit will interrogate the remote unit 92 and the remote unit will respond to the host unit 93 so that functions can be downloaded from the host unit to the remote unit.

When the remote unit is attached to the animal, the beacon LED 94 and LDR 113 are on when the unit is "awake" and monitoring and training. If the fence function is enabled 95 it is checked for containment. If the animal approaches the fence a fence warning signal is created 96 and a warning stimulus is provided to the animal 97. If the animal is close to the fence 98 a deterrent stimulus is provided to prevent escape 99. If the bark function is enabled 100 and barking is detected 101, the appropriate stimulus is provided to prevent barking 102. If the dig function is enabled 103 and digging is detected 104, the appropriate stimulus is provided to prevent digging 105. If the jump function is enabled 106 and jumping is detected 107, the appropriate stimulus is provided to prevent jumping 108. The beacon is turned off 109 and the unit is sent to sleep for a short period of time 110. The unit then resets 111 and the cycle is repeated continuously 112, independently of a user, as long as the battery supplies power. In this regard, the monitoring and training of the animal is "turned over" to the remote unit and the presence of a user is not required.

Figure 7:
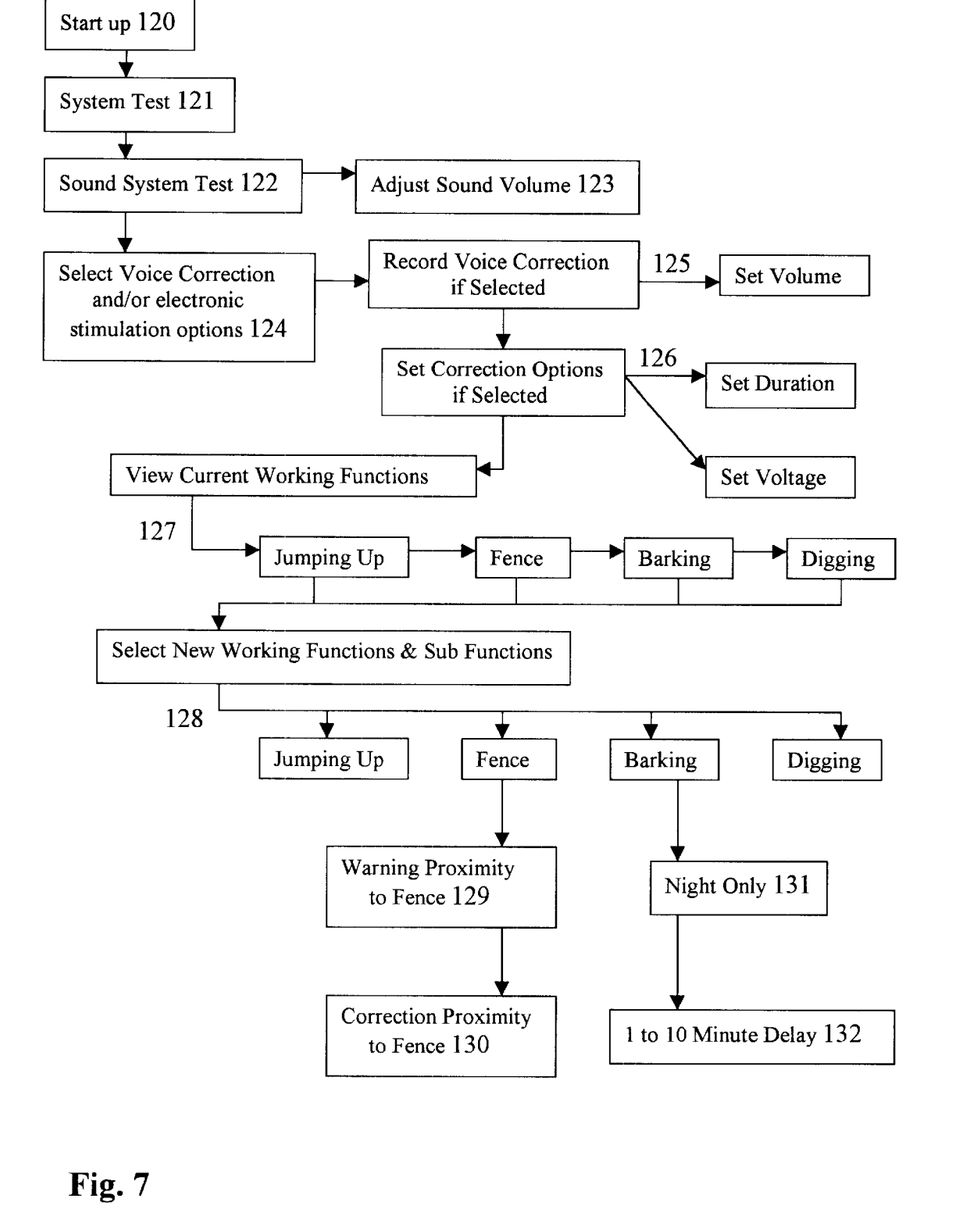
FIG. 7 shows a preferred embodiment of a navigation sequence for programming the remote unit with the host unit.

FIG. 7 shows a preferred embodiment of a navigation sequence for programming the remote unit with the host unit. The user visual interface can be a 2×16 character Liquid Crystal Display providing a display for 32 alpha numeric characters. The 'User Interface' subsystem 'starts up' when the remote unit is placed in the host unit 120. A system test is performed on the host and the remote microprocessor to test for functionality 121. A sound system test is performed to test for a comfortable user volume for the prerecorded messages played throughout the programming process 122. The user can at this point adjust the volume of these messages 123. This volume has no effect on the 'user voice correction' messages played while the remote unit is on the dog. The user is allowed to select a 'voice only' or 'electronic stimulation only' form of correction or may select a 'voice and electronic stimulation' form of correction 124. The volume is then set for the voice correction to be used while the remote unit is on the dog 125. If the user has selected voice and electronic stimulation correction, the user then selects a duration (time) for the stimulation to occur. A period of from one (1) second to a maximum of ten (10) seconds may be selected. A voltage to be applied, of from 500 volts to 4500 volts is then selected 126. The user then views the currently selected working functions; jumping up, fence, barking, and digging 127. The current working functions may be from none (0) to four (4). The user may then set new working functions and subfunctions 128. The user may add to an existing function or may eliminate a function and make a new function operative. The containment system or 'fence' has two user selectable options. The proximity or nearness to the fence before a warning is given may be selected 129. The proximity or nearness to the fence before a correction is given may be elected 130. The barking system has two user selectable options. The system may be set to function only at night when most nuisance barking occurs 131. The system may be set to function only after a user selectable delay of from one minute to ten minutes 132.

In another embodiment of the present invention, a dog may be trained to remain within a containment area using a Global Position System (GPS) which is known in the art. A GPS receiver located in the dog's remote unit receives signals from one or more GPS satellites and determines the receiver's current latitude and longitude. Differential GPS receivers currently have an accuracy less than one meter for the position of an object. The predetermined boundary as defined at initial setup is converted into longitude and latitude by the host unit processor and entered into the remote unit. The dog's current latitude and longitude can be obtained several times per second. When the dog's location is determined, using the GPS data and described in longitude and latitude and infringes upon the predetermined boundary, the correction sequence is initiated.

Figure 8:
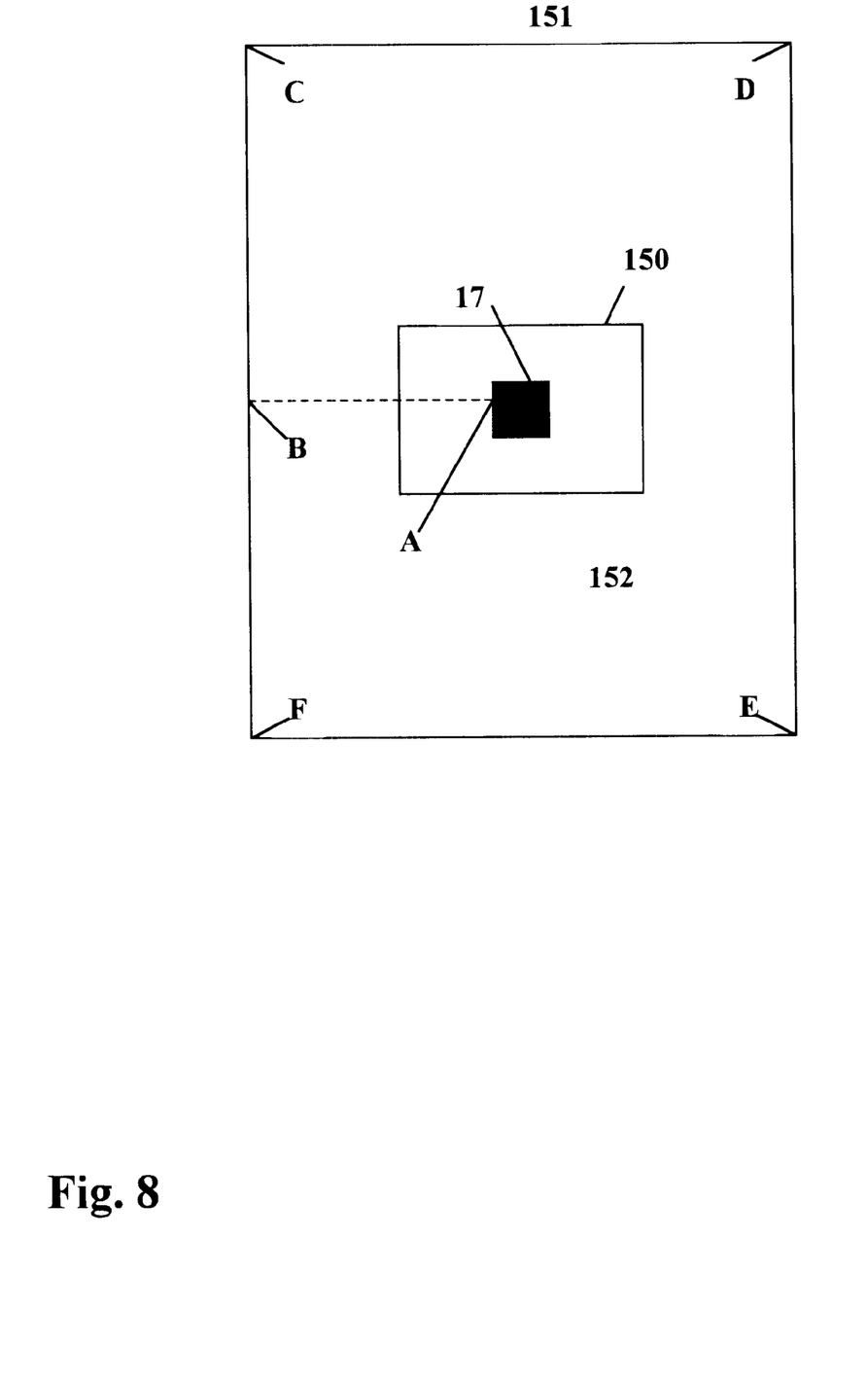
FIG. 8 shows a containment area with a boundary surrounding the host unit.

In this embodiment, remote unit 10 would have one or more differential GPS receivers 63 (a completely self-contained GPS subsystem) and external GPS antennae 62 interfacing with microprocessor 51 (see FIG. 4) which is adapted to receive electric wave signals transmitted by GPS satellites to the GPS receiver. These signals contain data necessary to calculate the position of the remote unit on the dog. The signals are transmitted from amplifier 55 to microprocessor 51 for these calculations. The microprocessor 51 is also programmed with boundary data as shown, for example, in FIG. 8. Host 17 is shown within a house 150 located within containment area 152 defined by boundary 151, further defined by boundary segments C-D, D-E, E-F, and F-C, including the distance and position of host unit 17 from boundary 151, designated by line A-B. The boundary data include distances or lengths of these boundary segments, and angles among them. Entry of the boundary data into host unit 17 using keypad 18 is accomplished, preferably, by starting with the position of host unit 17 global position system antennae 37 (See FIG. 3) and describing the measured angle and distance to a first waypoint (preferably a corner, such as point F) and then continuing around the property describing the length and angle of each boundary segment. Upon receiving boundary data, the host unit 17 converts this surveyed data into longitude and latitude data and places this data into the remote unit microprocessor 51 while remote unit 10 is docked to host unit 17. Based on GPS position data and boundary data, microprocessor 51 continually compares the dog location to the property boundary data. Anytime the dog moves towards or exits the boundary of the containment area, remote unit 10 via the microprocessor 51 performs the containment function as described above with various warnings and corrections. This embodiment could be used without a boundary wire antenna (external antenna 36), a transmitter, nor an electromagnetic field generated and transmitted by host unit 17.

The above-described embodiment may be modified in cases where less dependence upon the GPS data is desired. One or more differential GPS receivers may be used less frequently when used in conjunction with one or more motion sensors coupled with integrators. Integration of speed and direction on an inertial movement basis allows determination of the dog's position within the containment area. In this embodiment the differential GPS data is used only intermittently to reset a motion sensor integrator, and less power is required to operate the containment function, compared to using the GPS data alone. Suitable motion sensors include accelerometers or gyroscopes.

An accelerometer or gyroscope or any other suitable motion sensor can serve as a "sourceless" measurement of velocity or distance or force. It can do this because acceleration integrated over time equals the speed of an object. Speed integrated over time results in distance. Inertial force applications of motion sensors include personal navigation systems, car navigation systems, elevator controls, etc. Inertial guidance systems have for many years used accelerometers and gyroscopes to determine the position of ships and aircraft by means of "dead reckoning." The present invention uses one or more motion sensors, (including accelerometers and/or gyroscopes) to measure distance and vector or angle of travel or motion. The accelerometer or gyroscope has an axis of sensitivity, and the acceleration has a direction and magnitude relative to the motion sensor axis of sensitivity. Thus, the accelerometer or gyroscope is able to sense direction as well as distance when the motion sensor has an integrator. However, because the invention works at a relatively slow speed and because small DC errors accumulate at low speeds and become large errors, the motion sensor integrator requires resetting to known reference positions frequently. GPS data from a differential GPS receiver is used to accomplish this "resetting" to known reference points by microprocessor 51. After the remote unit is programmed with the necessary boundary data as described above, the remote unit motion sensor integrator, in combination with the microprocessor 51, continually measures distance and direction while the dog is in motion, thereby defining the position of the dog within the containment area. The motion sensor integrator data is reconciled with the GPS data periodically, preferably every 60 seconds, and the integrator is reset to a known reference point for the position of the dog within the containment area. The dog location data from the motion sensor integrator is continually compared to the property boundary data stored in the remote unit microprocessor, and the remote unit behaves as described above with warnings and corrections.

Although this aspect of the invention has been described with respect to the embodiment illustrated in FIGS. 1–8, various alternatives may be used without departing from the scope of the invention. For example, stimulators delivering stimuli other than sound or electric shock may be used. A nonremote unit using a tether may be used. A PC may serve as a host unit for providing instructions to the remote unit. The remote unit may be modified so that it can be controlled remotely by a user to train the animal directly. The remote unit may be constructed or used to train only a single behavior. The present invention may also be used to monitor and train other behaviors such as running, sleeping, rolling on the ground, eating, and the like. Various types of power supplies and batteries may be used, and different transmission signals may be used. The invention may be applied to many other kinds of animals in addition to dogs. Many other types of motion sensors may be applied to detect various movements.

It will be understood that various changes in the details, materials, and arrangements of the parts which have been described and illustrated above in order to explain the nature of this invention may be made by those skilled in the art without departing from the principle and scope of the invention as recited in the following claims.

What is claimed is:

1. An apparatus for behavior monitoring and training of a dog, comprising:
   1) a remote unit with a microprocessor, said remote unit having one or more motion sensors, global position system receivers and antennae, and stimulators, and powered by one or more batteries, wherein said remote unit operates in the absence of a user independently and continuously;
   2) a first program in said microprocessor to receive monitoring and training instructions from a user and signals from said motion sensor and said global position system receiver;
   3) a second program in said microprocessor to produce one or more stimuli in response to said signals and training instructions when said unit is attached to the dog; and
   4) said motion sensor being placed over the shoulder blade of the dog to detect digging and jumping.

2. The apparatus of claim 1 wherein said motion sensor is an accelerometer.

3. The apparatus of claim 1 wherein said motion sensor is a gyroscope.

4. The apparatus according to claim 1, said remote unit further comprising one or more voice generators and microphones.

5. The apparatus according to claim 4, said remote unit further comprising one or more light dependent resistors and light emission displays.

6. The apparatus according to claim 5 wherein said light dependent resistor allows said stimulators to function only during day or night.

7. The apparatus according to claim 6 wherein said stimulators include one or more electric shock circuits and loud speakers.

8. The apparatus according to claim 7 wherein said microphone detects vocalization, said microprocessor receiving signals from said microphone thereby producing one or more stimuli.

9. The apparatus according to claim 8 further comprising a power management circuit controlled by said microprocessor to provide low power consumption for said batteries.

10. The apparatus according to claim 9, said remote unit further comprising an antenna and receiver to detect containment signals from a containment system, said microprocessor producing one or more stimuli in response to said containment signals as the dog moves towards or exits said containment system.

11. The apparatus according to claim 10 further comprising a host unit having a microprocessor, a keyboard input, a visual display, and one or more global position system antennae, said remote unit docking with said host unit so that said microprocessor of said remote unit may be programmed by said microprocessor of said host unit, using said keyboard and visual display.

12. The apparatus according to claim 11 wherein said host unit further comprises a power supply and a charger to charge said batteries of said remote unit.

13. The apparatus according to claim 12 wherein said host unit further comprises an amplifier and an external antenna, said microprocessor of said host unit generating a containment signal transmitted by said amplifier to said external antenna, said external antenna surrounding a containment area in which said animal is to be confined.

14. The apparatus according to claim 13 wherein said containment signal generated by said microprocessor in said host unit is a continuous pseudo random phase encoded sinusoidal low frequency signal which allows said remote unit to permit said animal to enter said containment area without stimuli from said stimulators.

15. The apparatus according to claim 14 wherein said host unit further comprises a serial port for connection to a computer to allow for remote firmware upgrades.

16. The apparatus according to claim 1 wherein said global position system receiver provides to said microprocessor data to calculate the position of a dog within a containment area defined by a boundary, said microprocessor producing one or more stimuli in response to said data as the dog moves towards or exits the boundary of said containment area.

17. An apparatus for behavior monitoring and training of a dog, comprising:
   a) a remote unit with a microprocessor, said remote unit having one or more motion sensors, global position system receivers and antennae, and stimulators, and powered by one or more batteries, wherein said remote unit operates in the absence of a user independently and continuously;
   b) a first program in said microprocessor to receive monitoring and training instructions from a user and signals from said motion sensor and said global position system receiver;
   c) a second program in said microprocessor to produce one or more stimuli in response to said signals and training instructions when said unit is attached to the dog;
   d) said motion sensor being placed over the shoulder blade of the dog to detect digging and jumping; and
   e) said motion sensor being coupled with an integrator to calculate the position of the dog within a containment area.

18. The apparatus according to claim 17 wherein said motion sensor is an accelerometer.

19. The apparatus according to claim 17 where said motion sensor is a gyroscope.

20. The apparatus according to claim 17, said remote unit further comprising one or more voice generators and microphones.

21. The apparatus according to claim 20, said remote unit further comprising one or more light dependent resistors and light emission displays.

22. The apparatus according to claim 21 wherein said light dependent resistor allows said stimulators to function only during day or night.

23. The apparatus according to claim 22 wherein said stimulators include one or more electric shock circuits and loud speakers.

24. The apparatus according to claim 23 wherein said microphone detects vocalization, said microprocessor receiving signals from said microphone thereby producing one or more stimuli.

25. The apparatus according to claim 24 further comprising a power management circuit controlled by said microprocessor to provide low power consumption for said batteries.

26. The apparatus according to claim 25, said remote unit further comprising an antenna and receiver to detect containment signals from a containment system, said microprocessor producing one or more stimuli in response to said containment signals as the dog moves towards or exits said containment system.

27. The apparatus according to claim 26 further comprising a host unit having a microprocessor, a keyboard input, a visual display, and one or more global position system antennae, said remote unit docking with said host unit so that said microprocessor of said remote unit may be programmed by said microprocessor of said host unit, using said keyboard and visual display.

28. The apparatus according to claim 27 wherein said host unit further comprises a power supply and a charger to charge said batteries of said remote unit.

29. The apparatus according to claim 28 wherein said host unit further comprises an amplifier and an external antenna, said microprocessor of said host unit generating a containment signal transmitted by said amplifier to said external antenna, said external antenna surrounding a containment area in which said animal is to be confined.

30. The apparatus according to claim 29 wherein said containment signal generated by said microprocessor in said host unit is a continuous pseudo random phase encoded sinusoidal low frequency signal which allows said remote unit to permit said animal to enter said containment area without stimuli from said stimulators.

31. The apparatus according to claim 30 wherein said host unit further comprises a serial port for connection to a computer to allow for remote firmware upgrades.

32. The apparatus according to claim 17 wherein said motion sensor coupled with said integrator provides to said microprocessor data to calculate the position of a dog within said containment area defined by a boundary, said microprocessor producing one or more stimuli in response to said data as the dog moves towards or exits the boundary of said containment area.

33. The apparatus according to claim 32 wherein said global position system receiver provides to said microprocessor data to reset said integrator to a known reference point for the position of the dog within a containment area.

34. The apparatus according to claim 17 wherein said motion sensor is an accelerometer.

35. The apparatus according to claim 17 wherein said motion sensor is a gyroscope.

36. A method for behavior monitoring and training of a dog, comprising:
   a) inputting monitoring and training instructions into a microprocessor of a remote unit, said remote unit having one or more global position system receivers and antennae, and powered by one or more batteries;
   b) attaching said remote unit to the dog;
   c) attaching one or more motion sensors to the dog over the shoulder blade and connecting said motion sensor to said remote unit to monitor digging and jumping;
   d) said motion sensor sending signals to said microprocessor in response to said digging and jumping and said global position system receiver sending signals to said microprocessor to calculate the position of the dog within a containment area defined by a boundary;
   e) correcting unwanted digging and jumping by said remote unit producing one or more stimuli to the dog in response to said signals from said motion sensor;
   f) said remote unit providing one or more stimuli in response to said signals from said global position system receiver as the dog moves towards or exits the boundary of said containment area; and
   g) said remote unit operating in the absence of a user, independently, and continuously.

37. The method according to claim 36 where said motion sensor is an accelerometer.

38. The method according to claim 36 wherein said motion sensor is a gyroscope.

39. The method according to claim 36 wherein said remote unit has one or more voice generators and microphones.

40. The method according to claim 39 wherein said remote unit has one or more light dependent resistors and light emission displays.

41. The method according to claim 40 wherein said light dependent resistor allows said stimulators to function only during day or night.

42. The method according to claim 41 wherein said stimuli include one or more electric shocks or sounds.

43. The method according to claim 42 wherein said microphone detects vocalization, said microprocessor receiving signals from said microphone thereby producing one or more stimuli.

44. The method according to claim 43 wherein said remote unit has a power management circuit controlled by said microprocessor to provide low power consumption for said batteries.

45. The method according to claim 44 wherein said remote unit has an antenna and receiver to detect containment signals from a containment system, said microprocessor producing one or more stimuli in response to said containment signals as the dog moves towards or exits said containment system.

46. The method according to claim 45 further providing a host unit having a microprocessor, a keyboard input, a visual display, and one or more global position system antennae, said remote unit docking with said host unit so that said microprocessor of said remote unit may be programmed by said microprocessor of said host unit, using said keyboard and visual display.

47. The method according to claim 46 wherein said host unit has a power supply and a charger to charge said batteries of said remote unit.

48. The method according to claim 47 wherein said host unit has an amplifier and an external antenna, said microprocessor of said host unit generating a containment signal transmitted by said amplifier to said external antenna, said external antenna surrounding a containment area in which said animal is to be confined.

49. The method according to claim 48 wherein said containment signal generated by said microprocessor in said host unit is a continuous pseudo random phase encoded sinusoidal low frequency signal which allows said remote unit to permit said animal to enter said containment area without stimuli from said stimulators.

50. The method according to claim 49 wherein said host unit further comprises a serial port for connection to a computer to allow for remote firmware upgrades.

51. A method for behavior monitoring and training of a dog, comprising:
   a) inputting monitoring and training instructions into a microprocessor of a remote unit, said remote unit having one or more global position system receivers and antennae, and powered by one or more batteries;
   b) attaching said remote unit to the dog;
   c) attaching one or more motion sensors to the dog over the shoulder blade and connecting said motion sensor to said remote unit to monitor digging and jumping;
   d) said motion sensor being coupled with an integrator;
   e) said motion sensor sending signals to said microprocessor in response to said digging and jumping and said integrator sending signals to said microprocessor to calculate the position of the dog within a containment area defined by a boundary;
   f) correcting unwanted digging and jumping by said remote unit producing one or more stimuli to the dog in response to said signals from said motion sensor;
   g) said remote unit producing one or more stimuli in response to said signals from said integrator as the dog moves towards or exits the boundary of said containment area; and
   h) said remote unit operating in the absence of a user, independently, and continuously.

52. The method according to claim 51 wherein said motion sensor is an accelerometer.

53. The method according to claim 51 wherein said motion sensor is a gyroscope.

54. The method according to claim 51 wherein said remote unit has one or more voice generators and microphones.

55. The method according to claim 54 wherein said remote unit has one or more light dependent resistors and light emission displays.

56. The method according to claim 55 wherein said light dependent resistor allows said stimulators to function only during day or night.

57. The method according to claim 56 wherein said stimuli include one or more electric shocks or sounds.

58. The method according to claim 57 wherein said microphone detects vocalization, said microprocessor receiving signals from said microphone thereby producing one or more stimuli.

59. The method according to claim 58 wherein said remote unit has a power management circuit controlled by said microprocessor to provide low power consumption for said batteries.

60. The method according to claim 59 further providing a host unit having a microprocessor, a keyboard input, a visual display, and one or more global position system antennae, said remote unit docking with said host unit so that said microprocessor of said remote unit may be programmed by said microprocessor of said host unit, using said keyboard and visual display.

61. The method according to claim 60 wherein said host unit has a power supply and a charger to charge said batteries of said remote unit.

62. The method according to claim 61 wherein said remote unit has an antenna and receiver to detect containment signals from a containment system, said microprocessor producing one or more stimuli in response to said containment signals as the dog moves towards or exits said containment system.

63. The method according to claim 62 wherein said host unit has an amplifier and an external antenna, said microprocessor of said host unit generating a containment signal transmitted by said amplifier to said external antenna, said external antenna surrounding said containment area in which said animal is to be confined.

64. The method according to claim 63 wherein said containment signal generated by said microprocessor in said host unit is a continuous pseudo random phase encoded sinusoidal low frequency signal which allows said remote unit to permit said animal to enter said containment area without stimuli from said stimulators.

65. The method according to claim 64 wherein said host unit further comprises a serial port for connection to a computer to allow for remote firmware upgrades.

66. The method according to claim 51 wherein said global position system receiver provides to said microprocessor data to reset said integrator to a known reference point for the position of the dog within said containment area.

* * * * *